April 14, 1942.  S. C. SMITH ET AL  2,279,764
PROCESS FOR DISTILLATION
Filed July 6, 1939  2 Sheets-Sheet 1
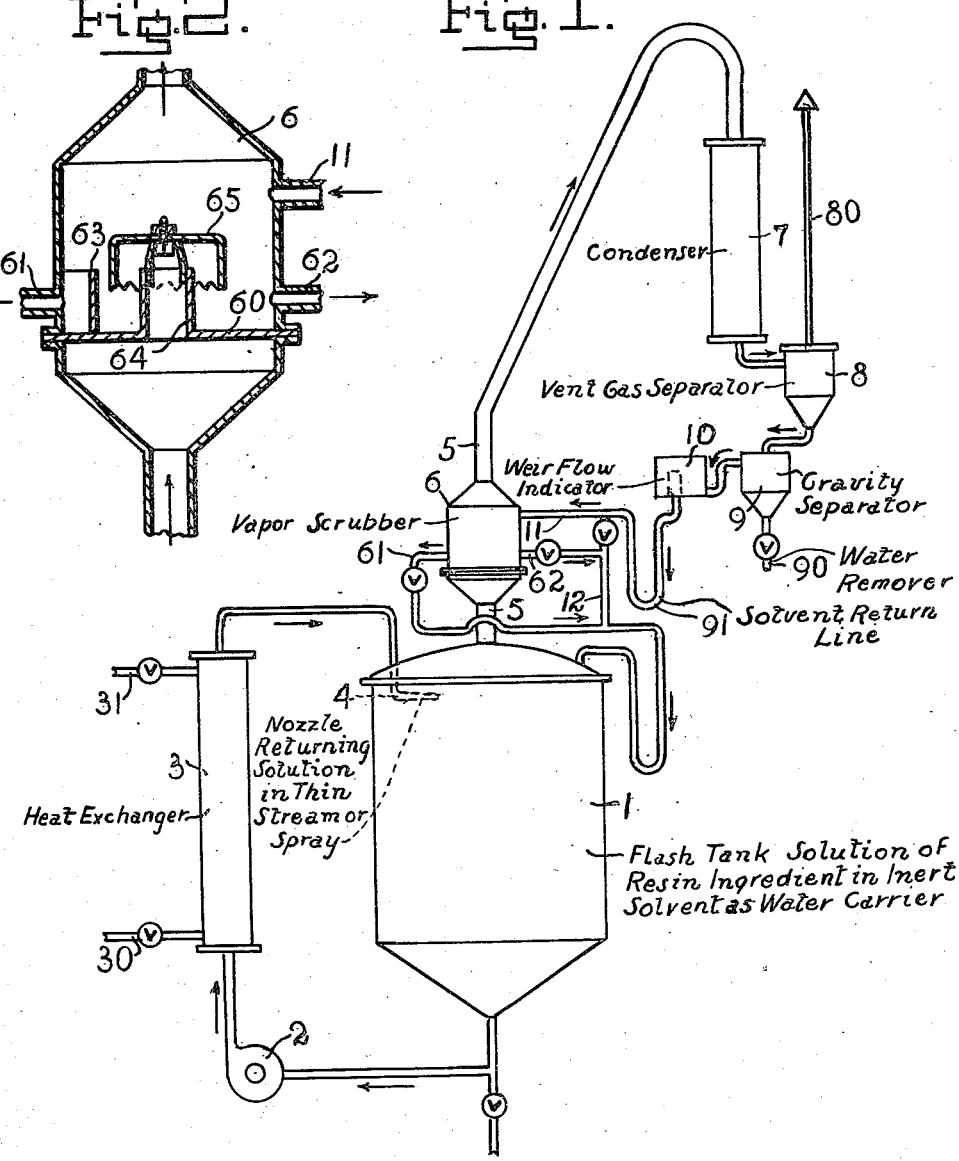
Inventors
Sidney C. Smith
Russell T. Van Ness
By R. F. Miller
Attorney

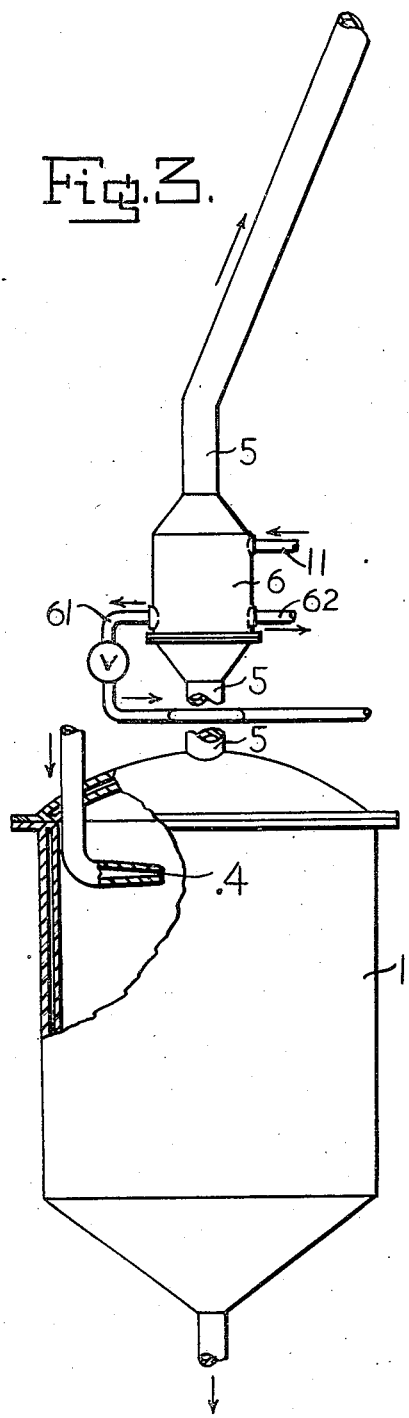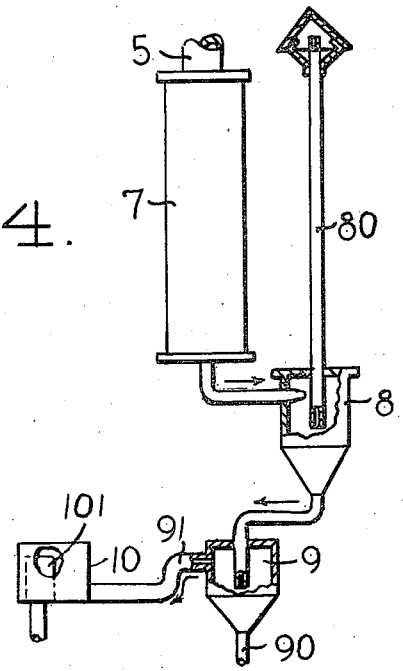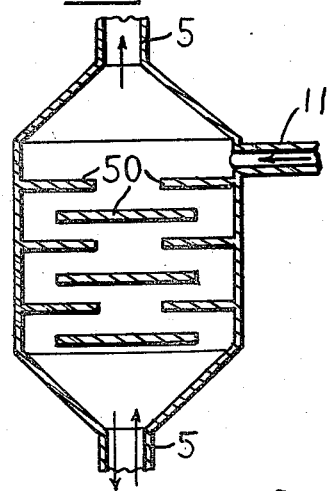

Patented Apr. 14, 1942

2,279,764

UNITED STATES PATENT OFFICE 2,279,764

PROCESS FOR DISTILLATION

Sidney C. Smith, Philadelphia, Pa., and Russell T. Van Ness, Wilmington, Del., assignors to E. I. du Pont de Nemours & Company, Wilmington, Del., a corporation of Delaware Application July 6, 1939, Serial No. 283,084

2 Claims. (Cl. 260—22)

This invention relates to synthetic resins and more particularly to a new method and equipment for manufacturing alkyd resins by the solution method.

The present invention is an improvement over the processes described in Patents 2,057,765 and 2,057,766 for the manufacture of resins of the alkyd or polyhydric alcohol-polybasic acid type by the solution method.

The term "polyhydric alcohol-polybasic acid resin" as used herein means the resinous condensation product resulting from the interaction of one or more polyhydric alcohols and one or more organic polybasic acids, with or without one or more modifying ingredients, such as the following: drying oils, semi-drying oils, non-drying oils, monohydric alcohols, monobasic or di-basic acids, especially those derived from drying oils, semi-drying oils, and non-drying oils, natural resins and other synthetic resins. The term "solution method" as used herein indicates a method which comprises heating the reacting ingredients in the presence of a substantially non-reactive solvent, removing the solvent and water of reaction by distillation and condensation, separating the water from the solvent while both are in the liquid phase, and returning the latter to the reaction zone, said process being carried out at sufficiently high temperatures to cause resinification, and for a period of time insufficient to cause gelation.

The solution method for manufacturing resins in the above mentioned patents is not, without the further features which characterize the present invention, adapted for the production of the resins in commercial quantities. The volatilization of the phthalic anhydride and resultant loss of this material through the water separator limited the temperature to a maximum of about 210° C. and required the use of solvents boiling not substantially above this temperature. By that process it is difficult to make resins of acid numbers as low as 0.5 to 6.0. Also the direct heating of the reaction vessel limits the effective heat transfer to that of the kettle walls in contact with the batch. The reaction time required was from 12 to 36 hours due to the low reaction temperature, high dilution of the reactants by solvent and the limited surface exposed to the vapor space for the release of solvent and water vapors.

This invention has as an object an improved method for making alkyd resins by the solution method. A further object is a solution method for manufacturing alkyd resins which as compared to previous methods results in greater resin yields, lower operating cost and the production of lower acid number resins. A further object resides in equipment for accomplishing these results. Other objects will appear hereinafter.

The preferred embodiment of our invention is described in connection with the accompanying drawings in which:

Fig. 1 is an elevation of a complete apparatus for carrying out our invention;

Fig. 2 is a sectional view of the vapor scrubber;

Fig. 3 is an elevation partly in section of a portion of the apparatus shown in Fig. 1;

Fig. 4 is a view showing in more detail a further view of the apparatus shown in Fig. 1; and Fig. 5 is a sectional view of another form of scrubber.

The numeral 1 indicates an insulated reaction vessel or flash tank the bottom of which opens into a conduit leading to the pump 2 which forces the reaction mixture through a tubular heat exchanger 3 after which it is forced into the tank again through a flared end pipe or nozzle 4 which provides a slit opening. The heat exchanger is of conventional type comprising a shell within which the reaction mixture passes through a plurality of thin pipes surrounded by the vapors of a heat transfer material consisting of an eutectic mixture of diphenyl and diphenyl oxide, or by other heating fluid circulating through the heat exchanger from an inlet 30 to outlet 31. A conduit 5 conducts the vapors from the flash tank through a scrubber 6 to a water cooled condenser 7. The scrubber, which is designed to cool and scrub the vapors ascending from the flash tank by the condensed solvent returning from the condenser, is shown in Fig. 2. The scrubber is provided with a bubble distillation plate 60, a solvent entrance pipe 11, exit pipe 61 and plate drain 62.

The solvent returned through pipe 11 builds up on the plate 60 to the top of the weir 63 over which it flows to the exit pipe 61. The solvent, water, phthalic anhydride and other vapors ascending through the chimney 64 are deflected by the cup 65 and bubble through the layer of liquid solvent which condenses the volatile ingredients and returns them to the flash tank. The vapors of solvent and water pass up through the line 5 after being reduced in the scrubber from the batch temperature of 220° C. or higher to about 140° C. when a low boiling solvent such as toluol is used and to about 165° C. when a high boiling solvent such as mineral spirits is used.

The vapors pass through the line 5 to the condenser 7 and the condensate runs to the cyclone separator 8 where the entrained inert gases are removed through the pipe 80. In the gravity separator 9 the water of reaction which settles to the bottom of these parts is removed through the valved pipe 90 and the solvent passes from the line 91 through a meter 10 where the rate of solvent refluxing is measured by a weir 101, and then through the solvent entrance pipe 11 into the scrubber. The return pipe 11 and plate drain 62 are connected through valves to a line 12 which connects with the solvent exit pipe 61 which leads back to the tank.

The method of conducting the present process in the manufacture of a typical alkyd resin is as follows:

Linseed oil and sufficient glycerine to form a monoglyceride are charged into the flash tank. The circulating pump is started, Dowtherm vapors at one to three atmospheres pressure admitted to the heater, and the batch heated to 225° C. At a temperature of 93° C. a small amount of litharge catalyst is added. The oil and glycerine are held at the reaction temperature of 225° C. until a sample indicates complete miscibility of one part of monoglyceride in three parts of 95% methyl alcohol. During this stage of the process any moisture in the kettle or ingredients passes off through the condenser and collects in the water separator.

The water separator is then filled to a marked level with water. The remaining volume of the separator and the solvent return piping are filled with solvent. A predetermined amount of solvent, approximately 8% of the batch solvent is fed into the tank to establish refluxing at 220° C. The lower boiling solvent of the thinners used in the final thin-down of the batch is used as the refluxing agent. An amount equal to about 8% of the resin batch (excluding thinners) is used and the reflux rate such as to provide about four turn-overs of this solvent per hour. Phthalic anhydride is charged into the flash tank and the batch brought to reaction temperature of 220° C. One-half hour after the phthalic anhydride addition, the remaining glycerine in the resin formula is added. The batch is held at reaction temperature, maintaining solvent refluxing, and samples taken for tests of acid number and viscosity until the desired end point is reached. Before each sampling, the reaction water is drained down in the separator to the level existing at the start to insure the same proportion of solvent in the batch. Cooling water rate of flow to the condenser is regulated to maintain a temperature in the solvent returning from the condenser of 50° C. to 70° C. Tests for viscosity are made by reducing a sample of the batch in thinners to the per cent solids desired in the finished batch, and comparing a standard sized tube of this with a Gardiner-Holt tube of known viscosity. The acid number is obtained by titrating a sample of the resin with potassium hydroxide, the acid number being read as the number of milligrams of potassium hydroxide required to neutralize the free acid in one gram of the resin. When acid number and viscosity tests indicate that the specifications have been obtained the scrubber by-pass valve is opened, the heat control valve on the heat exchanger closed, and the proper amount of thinners charged into the flash tank. During the thin-down the full flow of cooling water to the condenser is used to remove as much heat as possible from the batch. The temperature of the thinned batch is about 165° C.

The above description relates to a single-kettle unit. The monoglyceride may be made in a separate kettle. In this case the phthalic anhydride is charged into the monoglyceride, these ingredients then charged in the flash tank, reflux solvent added and the process continued as in the single kettle unit.

The solvent concentrations are preferably 2% to 14% and the temperature from 225° C. to 260° C.

Other and more simplified arrangements may be provided between the condenser and scrubber for separation of the water of reaction and return of solvent to the scrubber. The scrubber may be any of the known types in which the vapors are scrubbed by the solvent. The scrubber may be of the sieve plate type or it may provide other types of baffling instead of the bubble cap plate. Fig. 5 shows a form in which the condensed solvent returning through pipe 11 flows downward around the baffles 50 and directly into the reaction tank against the upward flow of ascending vapors.

The above process is applicable not only for the production of the resin from the reactants but also for beneficial treatment of the resin formed. The process may be used as a further or after treatment of alkyd resins made by the present solution method or by other methods to remove water or cloudiness or to improve the drying properties of the resin. The present process is applicable to the manufacture of all types of oil modified alkyd resins which are thinned in solvents inert to the resin.

The apparatus described above is also useful in dehydrating castor oil, the manufacture of urea-formaldehyde monohydric alcohol resins, varnishes by the solution method, plasticizers such as castor oil phthalate and dibutyl phthalate, and in fact the present apparatus and process is applicable to any process involving the esterification of two or more ingredients in which a liquid water carrier can be used.

This invention presents several valuable advantages over the previous practice in resin manufacture. Since by reason of the external heat exchanger the heat transfer is not limited to the kettle walls, it is possible to reduce the time required to bring the batch to reaction temperature by as much as 50%. The forcing of the resin or resin reaction mixture through the small heating tubes of the heat exchanger assures uniform heating and eliminates the possibility of localized overheating. The nozzle through which the resin or reaction mixture is returned to the flash tank causes the resin or reaction mixture to pass through the vapor space in thin sheets above the mass of material treated in the tank, or causes the injected material to be broken up in small sheets thereby exposing a large surface for the release of solvent and water vapors. This feature of our invention results in a markedly reduced reaction time. For instance, in the case of coconut oil modified resins the use of the nozzle reduces the reaction time by as much as 50%. Higher reaction temperatures (up to 260° C.), higher boiling solvents and lower solvent concentrations (as low as 2%) may be used since the present process is not limited to the low temperatures and high dilutions of 25 to 40% required in the prior practice to avoid loss of phthalic anhydride and other ingredients to the condensing system.

The higher reaction temperatures and lower solvent concentrations made possible by this invention both tend toward faster reaction and consequently shorter cooking. Higher acid number resins previously made in 12 to 36 hours can be made in three to five hours by the method described herein. Lower acid number resins which could not be made by the former equipment and process can be made in 6 to 12 hours by the procedure of this invention.

As many apparently widely different embodiments of this invention may be made without departing from the spirit and scope thereof, it is to be understood that we do not limit ourselves to the specific embodiments thereof except as defined in the appended claims.

We claim:

1. A process for making resins which comprises placing in a flash tank a solvent composed of a volatile organic liquid water-immiscible water carrier and a reaction mixture obtained from reactants comprising polyhydric alcohol and polycarboxylic acid, forcing the liquid contents from the flash tank and then into vapor space of the flash tank above the reaction mixture in a stream providing a large surface area, heating said liquid contents exteriorly of the flash tank before its passage therein in said stream, condensing the evolved vapors, separating the water from the condensate, returning the condensed solvent to the flash tank, and scrubbing the vapors evolved from the flash tank by passing them to the condenser in contact with and counter-current to the condensed solvent flowing from the condenser to the flash tank.

2. A process for making resins which comprises placing in a flash tank a solvent composed of a volatile organic liquid water-immiscible water carrier, a glyceride less than the triglyceride of a monobasic acid, and phthalic anhydride, forcing the liquid contents from the flash tank and then into the vapor space of the flash tank above the reaction mixture in a stream providing a large surface area, heating said liquid contents exteriorly of the flash tank before its passage therein in said stream, condensing the evolved vapors, separating the water from the condensate, returning the condensed solvent to the flash tank, and scrubbing the vapors evolved from the flash tank by passing them to the condenser in contact with and countercurrent to the condensed solvent flowing from the condenser to the flash tank.

SIDNEY C. SMITH.
RUSSELL T. VAN NESS.